(12) United States Patent
Pillen et al.

(10) Patent No.: US 10,668,809 B2
(45) Date of Patent: Jun. 2, 2020

(54) METHOD FOR CONTROLLING A VEHICLE HAVING AN ALL-WHEEL DRIVE DRIVELINE WITH A DISCONNECTING DRIVE UNIT

(71) Applicant: American Axle & Manufacturing, Inc., Detroit, MI (US)

(72) Inventors: Stephen Pillen, Rochester Hills, MI (US); Tony Pistagnesi, Beelle River (CA); Jeffrey L. Kincaid, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 156 days.

(21) Appl. No.: 15/981,017

(22) Filed: May 16, 2018

(65) Prior Publication Data
US 2018/0354361 A1 Dec. 13, 2018

Related U.S. Application Data

(60) Provisional application No. 62/516,311, filed on Jun. 7, 2017.

(51) Int. Cl.
| | |
|---|---|
| *B60K 17/35* | (2006.01) |
| *B60K 23/08* | (2006.01) |
| *B60K 17/344* | (2006.01) |
| B60K 17/346 | (2006.01) |
| F16H 3/54 | (2006.01) |

(52) U.S. Cl.
CPC ............ *B60K 23/08* (2013.01); *B60K 17/344* (2013.01); *B60K 17/35* (2013.01); *B60K 17/346* (2013.01); *B60K 2023/085* (2013.01); *B60Y 2300/182* (2013.01); *B60Y 2300/20* (2013.01); *F16H 3/54* (2013.01); *F16H 2200/0034* (2013.01); *F16H 2200/2005* (2013.01); *F16H 2200/2035* (2013.01); *F16H 2200/2064* (2013.01); *F16H 2200/2094* (2013.01)

(58) Field of Classification Search
None
See application file for complete search history.

(56) References Cited

U.S. PATENT DOCUMENTS

| | | | | |
|---|---|---|---|---|
| 4,903,811 A | * | 2/1990 | Kobayashi | B60K 17/35 180/233 |
| 5,630,772 A | * | 5/1997 | Tsukamoto | F16H 61/20 475/120 |
| 6,685,594 B2 | * | 2/2004 | Kanazawa | B60K 17/346 180/249 |
| 8,042,642 B2 | | 10/2011 | Marsh et al. | |
| 9,333,965 B2 | | 5/2016 | Marsh et al. | |
| 9,346,354 B2 | | 5/2016 | Valente | |
| 2003/0186768 A1 | * | 10/2003 | Evans | F16H 45/02 475/1 |
| 2015/0159708 A1 | * | 6/2015 | Ajimoto | B60K 23/0808 701/68 |

* cited by examiner

*Primary Examiner* — Justin Holmes
(74) *Attorney, Agent, or Firm* — Burris Law, PLLC

(57) ABSTRACT

A method for operating a vehicle having an all-wheel drive driveline with a disconnecting drive unit. The method conditions changing the operational state of the all-wheel drive driveline from a connected state to a disconnected state based in part on an operational state of a vehicle torque converter.

16 Claims, 2 Drawing Sheets

Figure 1:
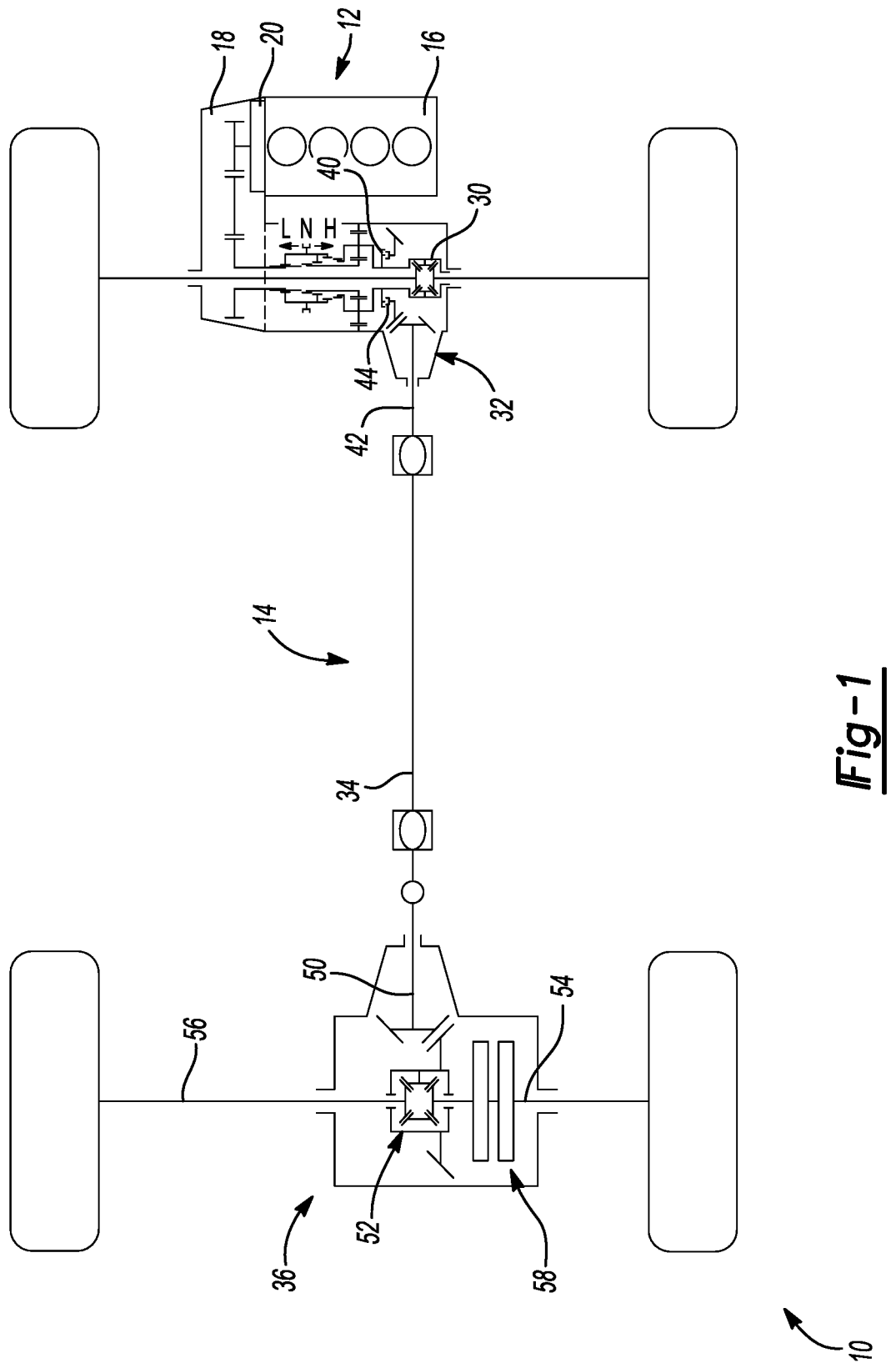

METHOD FOR CONTROLLING A VEHICLE HAVING AN ALL-WHEEL DRIVE DRIVELINE WITH A DISCONNECTING DRIVE UNIT

CROSS-REFERENCE TO RELATED APPLICATIONS

This application claims the benefit of U.S. Provisional Application No. 62/516,311, filed on Jun. 7, 2017, the disclosure of which is incorporated by reference as if fully set forth in detail herein.

FIELD

The present disclosure relates to a method for controlling a vehicle having an all-wheel drive driveline with a disconnecting drive unit.

BACKGROUND

This section provides background information related to the present disclosure which is not necessarily prior art.

U.S. Patent Application Publication No. 2010/0038164 discloses a vehicle with an all-wheel drive driveline with a disconnecting drive unit. More specifically, the all-wheel drive driveline includes a front differential, a power take-off unit, and a rear drive unit. The front differential is driven on a continuous basis to drive a pair of front vehicle wheels and provides rotary power to an input of the power take-off unit. The power take-off unit can provide rotary power to the rear drive unit to drive a pair of rear vehicle wheels. One or more clutches or couplings in each of the power take-off unit and the rear drive unit can be employed to selectively disconnect the output of the power take-off unit and the rear drive unit from the front differential to permit the driveline to be operated in a front wheel drive mode. Configuration of the driveline in this manner can be advantageous as it permits the driveline to be operated in an all-wheel drive (AWD) mode when those capabilities are desired, and to operate in a two-wheel drive (2WD) mode for better fuel economy when all-wheel drive capabilities are not desired.

It will be appreciated that it can be desirable to switch the operational mode of such disconnecting all-wheel drive drivelines between the AWD and 2WD modes during operation of a vehicle. Depending on the configuration of the vehicle powertrain (i.e., engine, transmission and torque converter) and the configuration of the driveline, it can be possible in some situations for the vehicle to generate noise when the operational mode of the driveline is changed from the AWD mode to the 2WD mode. Accordingly, there remains a need in the art for an improved method for operating a vehicle having an all-wheel driveline with a disconnecting drive unit.

SUMMARY

This section provides a general summary of the disclosure, and is not a comprehensive disclosure of its full scope or all of its features.

In one form, the present disclosure provides a method for operating a vehicle having an all-wheel drive driveline with a disconnecting drive unit. The method includes: operating the disconnecting drive unit in a connected state to transmit rotary power between an input of the drive unit and a pair of vehicle wheels; determining that an operational state of the drive unit is to be changed from the connected state to a disconnected state in which rotary power is not transmitted between an input of the drive and the pair of vehicle wheels; and responsive to determining that the operational state of the drive unit is to be changed from the connected state to the disconnected state, changing the operational state of the drive unit to the disconnected state in response to determining that a torque converter of the vehicle has not been locked for a period of time that exceeds a predetermined time threshold.

In another form, the present disclosure provides a method for operating a vehicle having an all-wheel drive driveline with a disconnecting drive unit. The method includes: operating the disconnecting drive unit in a connected state to transmit rotary power between an input of the drive unit and a pair of vehicle wheels; determining that an operational state of the drive unit is to be changed from the connected state to a disconnected state in which rotary power is not transmitted between an input of the drive and the pair of vehicle wheels; and responsive to determining that the operational state of the drive unit is to be changed from the connected state to the disconnected state, changing the operational state of the drive unit to the disconnected state in response to: determining that a speed of the vehicle exceeds a first predetermined vehicle speed threshold; or determining that the speed of the vehicle is within a predetermined vehicle speed range that is less than the first predetermined vehicle speed threshold and determining that a torque converter of the vehicle has been unlocked for a period of time that exceeds a predetermined time threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
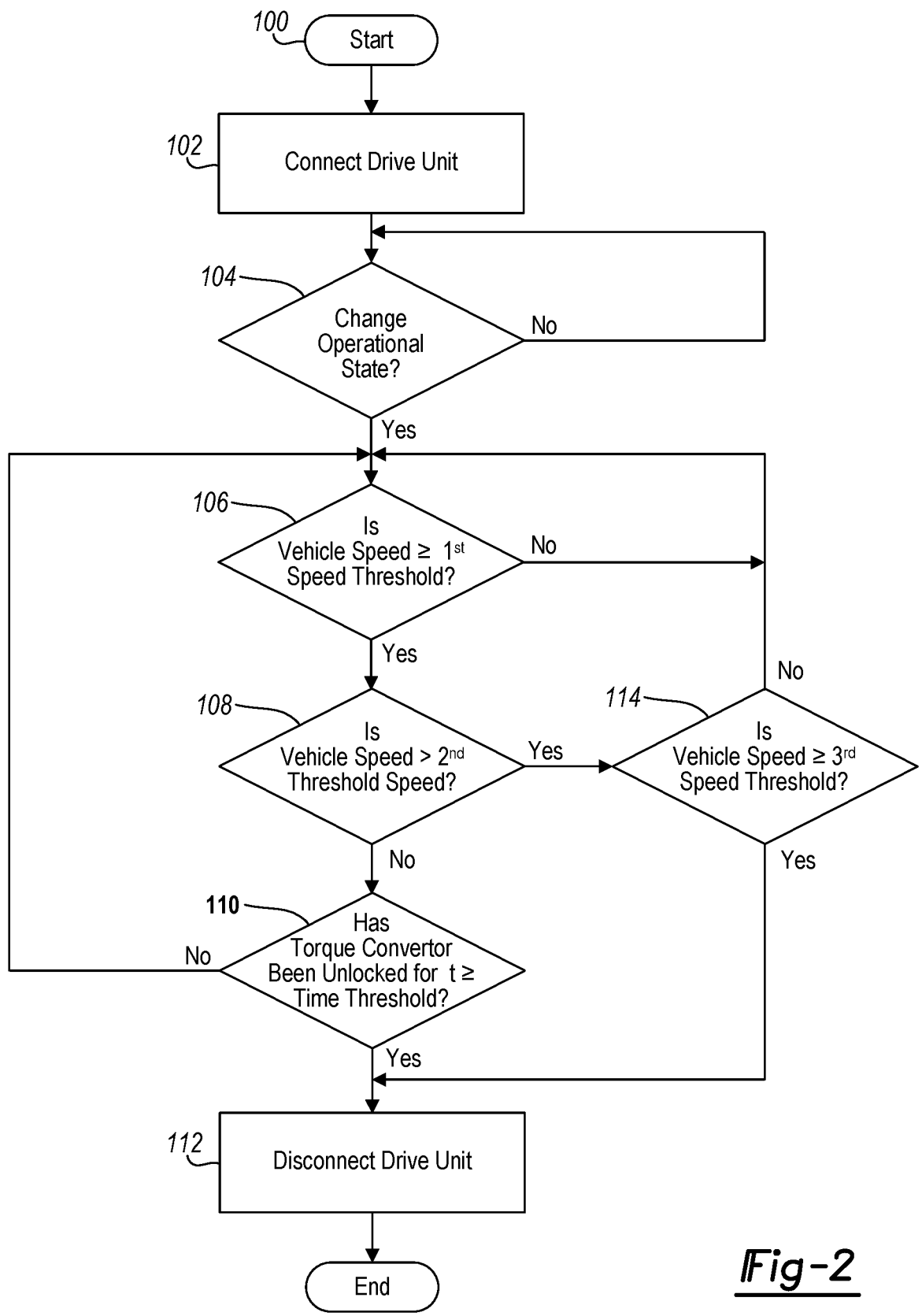

FIG. 1 is a schematic illustration of an exemplary vehicle having an all-wheel drive driveline with a disconnecting drive unit that is controlled in accordance with the teachings of the present disclosure; and FIG. 2 is a schematic illustration in flowchart form of an exemplary method for operating an all-wheel drive driveline with a disconnecting drive unit in accordance with the teachings of the present disclosure.

Corresponding reference numerals indicate corresponding parts throughout the several views of the drawings.

DETAILED DESCRIPTION

An exemplary vehicle 10 is shown in FIG. 1 as having a power train 12 and a disconnecting all-wheel drive driveline 14. The power train 12 includes a prime mover, such as an internal combustion engine 16, a transmission 18 and a torque converter 20 that is disposed between an output of the internal combustion engine 16 and an input of the transmission 18. The disconnecting all-wheel drive driveline 14 can include a front differential 30, a power take-off unit 32, a propshaft 34 and a rear drive module 36. Rotary power output from the transmission 18 can be transmitted to an input of the front differential 30. The power take-off unit 32 can include a PTU input member 40, which can be coupled to the input of the front differential 30, a PTU output member 42 and a first disconnect device 44 that can disposed in a power transmission path between the PTU input member 40 and the PTU output member 42. The propshaft 34 can couple the PTU output member 42 to a RDM input member 50 of the rear drive module 36. The rear drive module 36 can include a rear differential 52, a first RDM output member 54, a second RDM output member 56 and a second disconnect device 58 that can be disposed in a power transmission path between the RDM input member 50 and the first RDM output member 54. The disconnecting all-wheel drive driveline 14 can be operated in a disconnected mode in which the first disconnect device 44 does not transmit rotary power in the first power transmission path between the PTU input member 40 and the PTU output member 42, and second disconnect device 58 does not transmit rotary power in the second power transmission path between the RDM input member 50 and the first RDM output member 54. The disconnecting all-wheel drive driveline 14 can be also be operated in a connected mode in which the first disconnect device 44 transmits rotary power in the first power transmission path between the PTU input member 40 and the PTU output member 42, and second disconnect device 58 transmits rotary power in the second power transmission path between the RDM input member 50 and the first RDM output member 54.

Typically, the mode of the disconnecting all-wheel drive driveline 14 is changed from the connected mode to the disconnected mode when the vehicle 10 is operated at a speed that exceeds a predetermined speed threshold, such as 10, 15, 20 or 25 miles per hour. When the mode of the disconnecting all-wheel drive driveline 14 is changed from the connected mode to the disconnected mode, it can be possible (depending upon the configuration of the torque converter 20 and the transmission 18) for an occupant of the vehicle 10 to experience noise and vibration under some circumstances. To attenuate or eliminate the potential for noise and vibration when the disconnecting all-wheel drive driveline 14 is changed from the connected mode to the disconnected mode, operation of the disconnecting all-wheel drive driveline 14 is coordinated with the operation of at least one of the torque converter 20 and the transmission 18.

In the example provided, a change in the mode of the disconnecting all-wheel drive driveline 14 from the connected mode to the disconnected mode responsive to the identification of a mode change condition will additionally not occur until the torque converter 20 has been unlocked for a time period that is greater than or equal to a predetermined time threshold. The mode change condition could be based on the speed of the vehicle 10, and or optionally could also be based on various other operating parameters of the vehicle 10, such as steering angle and/or wheel slip. The predetermined time threshold could be set to any desired magnitude, such as 450 miliseconds. Alternatively, the predetermined time threshold could be set to zero seconds (i.e., thereby requiring only that the torque converter 20 be in an unlocked state).

Operation of the disconnecting all-wheel drive driveline 14 can additionally or alternatively be coordinated with the operation of the transmission 18 so that a change in the mode of the disconnecting all-wheel drive driveline 14 from the connected mode to the disconnected mode will additionally be coordinated such that the change from the connected mode to the disconnected mode does not coincide with a shift between gear ratios in the transmission 18. The term "coincide" is meant herein to include a first predetermined amount of time prior commencement of clutching in the transmission that is needed to commence the shift between gear ratios, and a second predetermined amount of time after engagement of the transmission 18 into the newly selected gear ratio.

The methodology of the present disclosure can be implemented by one or more controllers (not specifically shown) that is/are coupled to the power train 12 and the disconnecting all-wheel drive driveline 14.

With reference to FIG. 2, another example of the present methodology is schematically illustrated in flowchart form. The methodology can begin at bubble 100 and progress to block 102 where control causes the disconnecting all-wheel driveline 14 to operate in the connected mode. Control can proceed to decision block 104.

In decision block 104, control can determine if an operational state of the all-wheel drive driveline is to be changed from the connected state to the disconnected state. Control can determine if an operational state of the all-wheel drive driveline is to be changed based upon receipt of a request to change the operation al state of the all-wheel drive driveline or through evaluation of various vehicle parameters, such as vehicle speed, etc. If the operational state of the all-wheel drive driveline is not to be changed from the connected state to the disconnected state, control can loop back to decision block 104. If the operational state of the all-wheel drive driveline is to be changed from the connected state to the disconnected state, control can proceed to decision block 106.

In decision block 106, control can determine if the vehicle speed is greater than or equal to a first predetermined vehicle speed threshold, such as 10 or 15 miles per hour. If the vehicle speed is not greater than or equal to the first predetermined vehicle speed threshold, control can loop back to decision block 106. If the vehicle speed is greater than or equal to the first predetermined vehicle speed threshold, control can proceed to decision block 108.

In decision block 108, control can determine if the vehicle speed is greater than a second, larger predetermined vehicle speed threshold, such as 20 or 25 miles per hour. If the vehicle speed is not greater than the second predetermined vehicle speed threshold, control can proceed to decision block 110.

In decision block 110, control can determine if the torque converter has been unlocked for a time that is greater than or equal to a predetermined time threshold. The predetermined time threshold can be set to any desired value, such as 450 miliseconds. In the particular example provided, the predetermined time threshold is set to zero seconds (meaning that the torque converter need only be in an unlocked state). If the torque converter has not been unlocked for a time that exceeds the predetermined time threshold, control can loop back to decision block 106. If the torque converter has been unlocked for a time that exceeds the predetermined time threshold, control can proceed to block 112.

Returning to decision block 108, if the vehicle speed is greater than the second predetermined vehicle speed threshold, control can proceed to decision block 114 where control can determine if the vehicle speed is greater than a third predetermined vehicle speed threshold that is larger than the second predetermined vehicle speed threshold, such as 45 or 50 miles per hour. In the example provided, the third predetermined vehicle speed threshold is 54 miles per hour. If the vehicle speed is not greater than or equal to the third predetermined vehicle speed threshold, control can loop back to decision block 106. If the vehicle speed is greater than or equal to the third predetermined vehicle speed threshold, control can proceed to block 112.

In block 112, control can cause the all-wheel drive driveline to change operational modes and operate in the disconnected mode. Control can proceed to bubble 114, where control can end.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for operating a vehicle having an all-wheel drive driveline with a disconnecting drive unit, the method comprising:
    operating the disconnecting drive unit in a connected state to transmit rotary power between an input of the drive unit and a pair of vehicle wheels;
    determining that an operational state of the drive unit is to be changed from the connected state to a disconnected state in which rotary power is not transmitted between an input of the drive and the pair of vehicle wheels; and
    responsive to determining that the operational state of the drive unit is to be changed from the connected state to the disconnected state, changing the operational state of the drive unit to the disconnected state in response to determining that a predetermined set of parameters has been met, the predetermined set of parameters including operation of a torque converter of the vehicle in an unlocked state for a period of time that exceeds a predetermined time threshold.

2. The method of claim 1, wherein the first predetermined vehicle speed threshold is greater than or equal to 10 miles per hour.

3. The method of claim 2, wherein the first predetermined vehicle speed threshold is greater than or equal to 15 miles per hour.

4. The method of claim 3, wherein the first predetermined vehicle speed threshold is greater than or equal to 25 miles per hour.

5. The method of claim 1, wherein the predetermined time threshold is greater than or equal to zero.

6. The method of claim 5, wherein the predetermined time threshold is greater than or equal to 450 miliseconds.

7. The method of claim 1, wherein the predetermined set of parameters includes non-occurrence of a shift event between gear ratios of a transmission of a powertrain of the vehicle during an time interval over which the drive unit is to be changed from the connected state to the disconnected state.

8. A method for operating a vehicle having an all-wheel drive driveline with a disconnecting drive unit, the method comprising:
    operating the disconnecting drive unit in a connected state to transmit rotary power between an input of the drive unit and a pair of vehicle wheels; and
    determining that an operational state of the drive unit is to be changed from the connected state to a disconnected state in which rotary power is not transmitted between an input of the drive and the pair of vehicle wheels;
    responsive to determining that the operational state of the drive unit is to be changed from the connected state to the disconnected state, changing the operational state of the drive unit to the disconnected state in response to:
        determining that a speed of the vehicle exceeds a first predetermined vehicle speed threshold; or
        determining that the speed of the vehicle is within a predetermined vehicle speed range that is less than the first predetermined vehicle speed threshold and determining that a torque converter of the vehicle has been unlocked for a period of time that exceeds a predetermined time threshold.

9. The method of claim 8, wherein the first predetermined vehicle speed threshold is greater than or equal to 45 miles per hour.

10. The method of claim 9, wherein the predetermined vehicle speed range comprises vehicle speeds having a magnitude that is greater than or equal to 15 miles per hour and less than or equal to 25 miles per hour.

11. The method of claim 9, wherein the first predetermined vehicle speed threshold is greater than or equal to 50 miles per hour.

12. The method of claim 11, wherein the predetermined vehicle speed range comprises vehicle speeds having a magnitude that is greater than or equal to 15 miles per hour and less than or equal to 25 miles per hour.

13. The method of claim 11, wherein the first predetermined vehicle speed threshold is greater than or equal to 54 miles per hour.

14. The method of claim 13, wherein the predetermined vehicle speed range comprises vehicle speeds having a magnitude that is greater than or equal to 15 miles per hour and less than or equal to 25 miles per hour.

15. The method of claim 8, wherein the predetermined time threshold is greater than or equal to zero seconds.

16. The method of claim 15, wherein the predetermined time threshold is greater than or equal to 450 miliseconds.

* * * * *